United States Patent Office 2,820,000
Patented Jan. 14, 1958

2,820,000
DENTIFRICE COMPRISING DIATOMACEOUS SILICA

Alfred Menzies, Los Angeles, Calif.

No Drawing. Application April 3, 1953
Serial No. 346,791

4 Claims. (Cl. 167—93)

This invention relates to a dental cleaning and scouring compound. In modern oral hygiene, in addition to or in place of the usual scouring of teeth by means of dentifrices and brushes, it is recommended that the teeth be also cleaned by means of a scouring and polishing powder usually applied to the teeth by means of some applicator which rubs the teeth. This is commonly a rubber buffer rotated at high speed and usually entails a visit to the dentist.

I have discovered that this technique can be avoided and the cleansing action obtained by the patient and also in his home by the use of a novel cleansing compound and a novel technique for its application to the teeth.

I have found that the use of diatomaceous silica, when of proper purity and particle size, when properly compounded and applied, has such low abrasive qualities as not to scratch the enamel of the teeth or the porcelain or plastics employed in making false teeth and dentures. The compound, however, can, when properly applied, cause a removal of the mucous and salivary plaques which accumulate irrespective of best oral hygiene methods employed, using common dentifrices, employing soaps or other detergents.

I have found that in order to obtain the desired properties to act successfully for the purposes of my cosmetic tooth polish, it is preferable to employ a particular type of diatomaceous silica. The diatomaceous silica which I find preferable is one substantially free of organic matter present in many diatomaceous earths and containing a low percentage of materials, other than silica, the contaminants being present preponderately as silicates. The silica is present in the form of diatoms. The material is crushed so that substantially all passes a 325 mesh. The material is a mixed diatomaceous silica which has been heated to about 1800° F. beforehand.

I have found it desirable that the particles be not small for the polishing characteristics. I have found that a particle size distribution which gives less than 10% under 2 microns is a highly useful product.

Without intending to be limited by any theory, it appears that the particular advantage of my polish results from the presence of cellular clumps of individual sharp edge diatoms which are aggregated in the clumps which form the fine mesh particles.

To obtain my superior results, I select the type of diatomaceous silica aggregate which forms the particles so that these particles have a hardness on the Mohr scale of less than tooth enamel. On this scale, tooth enamel has a value of 7. I select the diatomaceous silica particles which have a value of under 7 and as low as 3.5 to 5.5, for example about 4.5.

I have also found that if the particles used are large, for example, have an average size of about 2 or 3 times that indicated above, the particles are not as useful as dental cleaners.

Diatomaceous silica is present in many types of diatomaceous earths or kieselguhrs. The term "kieselguhr" is applied to diatomaceous earths found in Germany which are contaminated by iron and aluminum, containing silicates in high amounts, and by clay, sand, carbonate of lime and magnesia and oxides or carbonates of iron. They also contain large amounts of organic material. Such material is not suitable for dental use. It is gritty and also may have hardness great enough to scratch the dental enamel or injure the gums.

However, I employ selected grades of diatomaceous earths to obtain diatomaceous silica which is substantially free of moisture and organic matter which contains minute traces of contaminants and to obtain a suitable particle size distribution so that the material is suitable for application to teeth. Such a diatomaceous silica should by analysis contain silica in excess of 90% and preferably at least about 93%. A preferred diatomaceous silica, as described below, contains about 94 to 96% $SiO_2$.

In applying the material to the teeth, I use an applicator which is softer than the enamel of the teeth and softer than the diatomaceous silica. The purpose of the procedure found particularly useful is to apply a film of the dental cosmetic to the enamel, applying pressure to the individual particles against the teeth with a wiping action. Under the influence of this wiping action the diatomaceous silica removes the mucous and salivary plaques present on the teeth, leaving a clean highly polished dental surface. Under such conditions, I find it desirable that the dental cosmetic of my invention contain no material harder than enamel. Preferably, since I rely upon the action of the diatomaceous silica, I prefer that there be no solid material present in the dental composition which is harder than the diatomaceous silica mixture employed. This is particularly important since, in the method of application which I prefer to employ, considerable pressure is exerted against the grains of the powder. The use of hard abrasive grains would result in serious damage to the enamel.

However, I find that not only is it desirable to employ grains of diatomaceous silica substantially free of material having a substantially high hardness on the Mohr scale, for example, hard enough to scratch dental enamel, but I have also found that the particle size of the diatomaceous silica is of critical importance.

I have found that the diatomaceous silica passing a 300 mesh and having a very small percentage, 10% or less, of particles under about 2 microns by the Oden method are suitable. However, if this fraction is further crushed as by rubbing the powder against a glass plate with a spatula to destroy the aggregates of individual diatoms forming the particles so as to give a substantially impalpable powder, the material does not act nearly as well as a dental cosmetic and the cleaning action when carried out by the method of pressure application herein described is materially and noticeably decreased.

On the other hand, if I employ a diatomaceous silica the average particle of which is 2 or three times as great, for example, one having particles such that up to 5% will be retained on a 150 mesh (about 15% being greater than 20 microns with about 45% between 10 and 2 microns) it also is found materially less effective than the entire product which passes the 300 mesh screen.

While I do not wish to be bound by any theory of the action of the cleaner, I believe that the effectiveness of the cleanser derives from the sharp edges of the individual diatoms. These diatoms are held in a cellular structure having the sharp edges. These are produced by grinding mined earth and if the material is ground to too fine a mesh, the sharp edges of the diatoms are destroyed by the grinding action. However, if the particles are too large, then they act like gravel in the mouth and rubbing against the gums injures the gums when pressure is used to apply this material to clean the teeth.

Thus, the use of a diatomaceous earth in particles fine enough not to injure the gums and coarse enough so that the sharp edges of the diatoms have not been destroyed in the grinding action used to produce them, has been found most suitable, where the material is used to clean the teeth by applying pressure against the grains on the teeth.

In order to assist in the cleansing action, I find it desirable to incorporate a dry powdered soap, about 5% to 40% by weight based on the diatomaceous silica, for example, castile soap, i. e., soap made from olive oil. This soap has antiseptic qualities and is particularly useful in my dental cosmetic. Other soaps may be used, for example, alkali metal soap made from the other well known soap forming saturated and unsaturated fatty acids, especially those known to be physiologically harmless, for example, the stearates and palmitates, as well as the oleates. Physiologically harmless wetting agents may also be added.

I prefer to use a mixture which is not acidic and may add to the mixture of soap and diatomaceous silica, carbonates such as magnesium and lithium carbonate. The carbonates are attacked by the lactic acid in the mouth and in the salivary plaque and thus act to neutralize the acidity on the teeth and in doing so release carbon dioxide which gives a mild frothing action to aid in the separation of the salivary plaque from the teeth. The dry soap powder and the dry carbonate powder also prevent the caking of the dental cosmetic powder on the teeth. Without these materials the powder tends to cake up on the teeth.

The neutralizing agents such as alkali metal or alkaline earth carbonate, e. g., sodium carbonate, lithium carbonate, or magnesium carbonate, may be added in minor amounts from about 5 to 30% of the diatomaceous silica for purposes more fully described below. Silicone oils such as described below may also be added for purposes more fully set forth below.

All of these powders have a hardness value less than the diatomaceous silica.

Flavoring materials may be added to impart a pleasant taste to the dental cosmetic. A suitable formulation for this use is as follows:

Diatomaceous silica, preferably all particles passing a 300 mesh, is ground so that less than 10% of the material is finer than 2 microns in size. The material is substantially anhydrous containing less than 2% water and has a high water absorption and will absorb about 1.5 times its own weight of water. It is highly porous. It is substantially free of non-siliceous material; the $SiO_2$ content on a substantially anhydrous basis is in excess of 90%; the material other than $SiO_2$ being substantially iron and alumina silicates.

A preferred material is as follows: It has the following chemical constitution on a substantially moisture free basis: About 94% $SiO_2$; about 3% $Al_2O_3$; about 1% $Fe_2O_3$; and about 1.5% (CaO, MgO, $K_2O$ and $Na_2O$). The material is free of organic material and all sharp or hard particles. Thus it contains none of the flint, clay, sand or organic matter usually found in kieselguhr or other crude diatomaceous earths. Particle size: all pass through a 325 mesh screen.

The typical approximate average particle size distribution of the preferred material is as follows: Coarser than 40 microns, none; less than 10 and more than 6, about 12%; less than 6 and more than 1, about 81%; less than 1, about 4.5%.

Wherever the term "particle size distribution" or "average particle size" is referred to in the specification and claims it is understood to mean that determined by the Oden sedimentation method described in Soil Science, vol. 19 (1925) pages 1 to 35.

Wherever "particle size or particle size distribution of the diatomaceous silica" is referred to in this specification and claims, it is understood to refer to the diatomaceous silica before incorporation of the other ingredients of the mixture forming my dental cleaning compound.

With this material I incorporate, by intimate mixing, more than 5% and less than 40% (based on the weight of the diatomaceous earth) of dry powdered castile soap. I have found that 5% or less of the soap makes a product which tends to cake on the teeth and tastes chalky, and 40% of the soap gives a material having a bad odor with a soapy gritty taste. I have found that soap powder equal to about 15% of the diatomaceous earth by weight gives a material which does not cake on the teeth and does not have an unpleasant odor or taste and does not feel gritty.

I may add to this material about 15 to 30% by weight of lithium carbonate and from about 25 to 30% by weight of magnesium carbonate. The carbonate is preferably of at least the fineness of the diatomaceous silica. On intimate mixture of these materials I may add, in addition, flavoring agents.

A suitable composition is as follows: Diatomaceous silica, 21 grams; $MgCO_3$, 4½ grams; $Li_2CO_3$, 4½ grams; castile soap, 3 grams; saccharine, 1 gram; oil of cassia, 1½ cc.; oil of peppermint, ½ cc.; oil of wintergreen, 1 cc.

This material is intimately mixed. The powder tends to ball up into small aggregates bound by the added oils, but the aggregates are very friable, even more so than the diatomaceous earth particles. If desired they may be forced through fine meshed screens about 200 mesh and the aggregates will be separated into fine particles of about 200 or 300 mesh by this procedure.

In applying this material, the powder is pushed up by an applicator and conveyed to the teeth. For example, I use a roll of cotton batting similar to a cotton dental roll. The end of the roll, slightly moistened, is dipped in the powder and the powder carried to the teeth. The coated end of the roll is rubbed across the teeth with a to-and-fro motion without using any fluid other than the natural saliva in the mouth which may accidentally get on the teeth. Instead, the powder may be applied with a rubber buffing cup such as used by dentists when they polish the teeth with pumice.

In both cases the applicator applies a considerable pressure against the powder on the teeth. It is for this reason that it is important that the material have a hardness value such that it will not scratch the enamel but be hard enough to cut through the salivary mucous plaque, or what is more generally referred to as stain and tartar on the teeth.

When so used the teeth are clean, polished, and because of the high polish the attachment to the teeth of soil and calcareous deposits which build tartar is more difficult and the teeth appear and feel smooth, slick, and clean for a long time. No such results, in my long experience as a practicing dentist, are possible using paste or powdered dentifrices or the pumice or other dental cleansers used by dentists or by lay people.

I have also found that the incorporation in the powder of the dental cleaning compounds having the composition described above of a small amount of silicone oil and preferably the silicone oils which predominantly are the siloxanes, such as, for example, the alkyl siloxanes, aryl siloxanes; for example, the aryl alkyl siloxanes have the property of increasing the tooth polish which may be obtained and the teeth remain cleaner and unstained for a longer period of time than if the silicone oil is not used.

While I do not wish to be bound by any theory of the action of the material, it appears probable that during the cleansing action, silicone oil is deposited on the teeth by transference on the teeth to impart a film of silicone oil to the teeth. Silicone oils have the property of repelling water and thus the silicone coated teeth will resist the attachment of soils and calcareous deposits which deposit from the coating saliva. The silicone oils are bland and are not physiologically harmful.

I may use the siloxanes produced by hydrolysis of dimethyl dichloro silane or diethyl dichloro silane or the hydrolysis of diethyl dialkoxysilane.

The preferred oil, because of its utility in my material and its physiologically harmless quality when used in a dental cleanser, is the methyl silicone oil made by hydrolysis of dimethyl dichloro silane or trimethyl dichloro silane or mixtures thereof to give the methyl silicones. This is believed to be the material sold by the General Electric Company and named G. E. Silicone SF series. I prefer to use this oil and to employ the lowest viscosity material of centistokes at 100° F. This material has a specific gravity 20/20° C. of 0.964. I may, however, use higher viscosity oils which will adequately mix with the powder. If too viscous the oils may be diluted with suitable physiologically harmless diluents, as will be understood by those skilled in the art.

I may use this material, preferring not to use so much of it as to give a greasy or mushy powder but rather one that appears dry. Thus, I may use with the last mentioned composition given above about 5 to 15 cc. of the silicone oil, a suitable amount being 10 cc. Similar quantities of the material may be added to the compositions described above, i. e., from about 25 to 75% of the silicone oil by weight based on the diatomaceous silica. The silicone oil is added after incorporating the other ingredients, i. e., at the last, so that the grains of the powder are coated by the silicone.

While I have described a particular embodiment of my invention for the purpose of illustration, it should be understood that various modifications and adaptations thereof may be made within the spirit of the invention as set forth in the appended claims.

I claim:

1. A dental cleansing composition, comprising a major portion of diatomaceous silica and a minor portion of a dry powdered soap, said silica being pure to the extent of containing in excess of 90% $SiO_2$, said silica having a particle size distribution such that the entire silica will pass a 300-mesh screen and not more than about 10% thereof has a particle size of under 2 microns, all the ingredients of said composition having a hardness value less than dental enamel.

2. A dental cleansing composition as defined in claim 1, said dry powdered soap being present in amount by weight of approximately from 5% to 40% of the diatomaceous silica.

3. A dental cleansing composition as defined in claim 2, and further including carbonate salt chosen from the group consisting of the alkali metal and alkaline earth carbonates in an amount by weight of approximately from 5% to 30% of the diatomaceous silica.

4. A dental cleansing composition as defined in claim 3, and further including silicone oil in amount by weight of approximately from 25% to 75% of the diatomaceous silica.

References Cited in the file of this patent

UNITED STATES PATENTS

| Number | Name | Date |
|---|---|---|
| 908,131 | Potter | Dec. 29, 1908 |
| 1,467,024 | Bergve | Sept. 4, 1923 |
| 1,627,446 | Moseley | May 3, 1927 |
| 2,059,396 | Ripert | Nov. 3, 1936 |
| 2,222,969 | Kistler | Nov. 26, 1940 |
| 2,550,207 | Tainter | Apr. 24, 1951 |

FOREIGN PATENTS

| Number | Country | Date |
|---|---|---|
| 633,845 | Great Britain | Dec. 30, 1949 |
| 686,429 | Great Britain | Jan. 21, 1953 |

OTHER REFERENCES

U. S. Dispensatory, Wood, 22d ed., 1937, pp. 1101–1103.

Drug and Cos. Ind. (Thomssen), December 1944, p. 673.